May 3, 1938. H. E. GAUSS 2,116,110
ELECTRICAL INDICATOR OR MEASURING INSTRUMENT
Filed Dec. 10, 1936
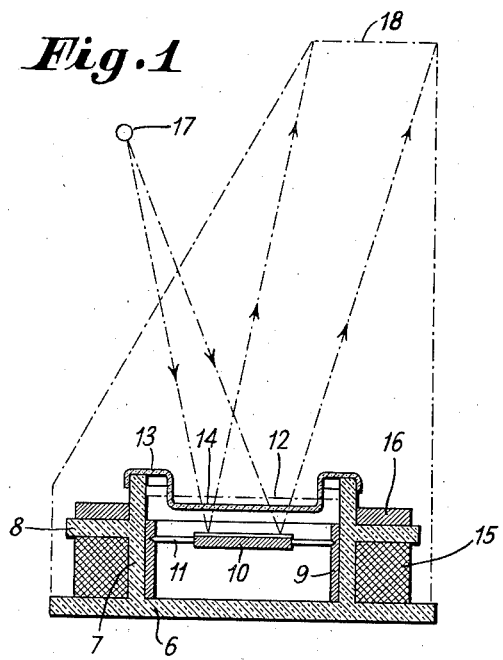
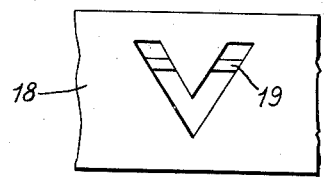
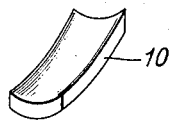
INVENTOR
H. E. GAUSS
BY
ATTORNEY Patented May 3, 1938

2,116,110

UNITED STATES PATENT OFFICE 2,116,110

ELECTRICAL INDICATOR OR MEASURING INSTRUMENT

Hubert Edward Gauss, Middlesex, England, assignor to Electric & Musical Industries, Ltd., Middlesex, England Application December 10, 1936, Serial No. 115,100
In Great Britain December 16, 1935

2 Claims. (Cl. 177—311)

This invention relates to improvements in electrical indicators or measuring instruments of the kind which are sensitive to small direct currents, and in particular to reflecting galvanometers wherein an armature is polarized to lie transversely of its operating field.

Such instruments are known for example in which a magnetic armature is arranged for pivotal movements about an axis at right angles to the longitudinal axis of a surrounding coil through which the currents to be measured or indicated are passed, the armature being polarized by a suitably located magnet.

Such instruments are well adapted for use in connection with the tuning circuits of radio receivers to indicate whether the receiver is properly tuned, since they may be arranged to respond to the direct current component flowing in say the output circuit of the detector, which varies from a minimum when tuned, upwards as the tuned condition is departed from in either direction.

The object of the present invention is to provide an improved instrument of this kind of great sensitivity, the measurements or indications of which are afforded by the deflection of a reflected beam of light over a scale or screen.

In accordance with the present invention an indicating or measuring instrument is provided comprising an armature which is polarized to lie transversely of its operating field, the armature being so formed that one of its surfaces functions to reflect light from a suitable light source onto a scale or screen located in the path of the reflected light image so that movement of the armature is indicated by movement of an image over the said scale or screen.

The mirror surface may be flat, or of concave cylindrical or concave spherical form. The flat mirror surface may be employed with an auxiliary lens to give a bright spot image on the scale or screen. The concave cylindrical mirror surface focusses the light from the source into a real line image, while the concave spherical mirror surface may be employed to afford a spot image of either a lamp filament or of a diaphragm interposed between the lamp and the armature. Preferably, the movement of the armature is damped by locating the armature in a body of oil or other suitable medium. For this purpose the armature is mounted in a suitable housing, the housing being closed by a transparent cap which is preferably so shaped as to prevent oil bubbles collecting in the path of the light to and from the armature.

In order that the said invention may be clearly understood and readily carried into effect, the same will now be more fully described with reference to the accompanying drawing in which:

Fig. 1 is a vertical section of the measuring instrument in accordance with the invention;

Figs. 2 and 3 illustrate two forms of armature for use in the invention and,

Figs. 4 and 5 illustrate portions of a scale or screen suitable for use with the invention.

As shown in Fig. 1 of the drawing, the measuring instrument comprises a moulded former preferably of a synthetic resin material having a flat base 6, an upwardly extending cylindrical or cup-like portion 7 of somewhat smaller diameter than the base 6 and a flange 8 surrounding the portion 7 and spaced from and parallel to the base 6. The lower half of the cylindrical portion is fitted with a brass or other non-magnetic sleeve 9 in which the armature 10 is suspended. The armature may be made of a rectangular block of stainless steel and in the form shown is ground and polished on its upper side to a concave cylindrical surface as shown in Fig. 2, the armature 10 being mounted on a spindle of fine steel wire 11 sharpened to fine points at each end. The ends of the spindle 11 engage in bearings formed by depressions or recesses in the inner surface of the sleeve 9 at diametrically opposite points.

The cup formed by the cylindrical portion 7 is filled with oil to a level above the armature 10 as indicated, for example, by the dotted line 12 and the upper end of the cylindrical portion is closed by a Celluloid or other transparent cover 13, which seals the cup and which is provided with a central depression 14 of a depth to enter the oil in the cup so that when the cover is applied the oil is caused to rise into an annular space formed between the wall of the cylindrical portion 7 and the outer wall of the depression 14. By such construction, all air bubbles are eliminated from the oil-filled space between the armature and the bottom of the depression 14 in the cover. Air bubbles will be similarly eliminated from this space even if the instrument were used on its side, since all the air bubbles would, in this case, be located in the upper portion of the annular space.

The space between the bottom of the former and the flange 8 serves to house a coil 15 through which currents to be measured are passed and an armature polarizing magnet 16 of suitable form is mounted on the upper surface of the flange 8 as shown.

Light from a source 17 is directed onto the armature 10 and the armature reflects the light onto a suitably disposed scale or screen 18. If the light source 17 embodies an electric lamp with a small filament, a line image will be projected on the screen 18 when the armature is of concave cylindrical form as shown in Fig. 2. A finer line image may be obtained by employing a lamp with a line filament so mounted that the filament is parallel to the axis of curvature of the mirror surface of the armature. If desired, further refinement of the light image may be obtained by suitably disposing the light source 17, armature 10 and screen 18 in such a manner that there is little or no lateral magnification of the filament, the limit being imposed by the sensitivity desired and the physical dimensions. It is found that the image may be readily made of such intensity that it is easily visible even in direct sunlight.

Instead of making the mirror surface of the armature 10 of concave cylindrical form as shown in Fig. 2, the mirror surface may be made of a concave spherical form as shown in Fig. 3. In this case, a spot of light as distinct from a line of light will be visible on the screen 18.

While the armature 10 may be made of ground and polished stainless steel, in some cases, however, the armature may be made of soft iron or other ferro-magnetic material, likewise ground and polished and, if desired, plated and again polished to provide a highly reflecting surface, the soft iron armature in either case being employed with or without a protective coating of lacquer or similar material.

Preferably, instead of making the reflective surface on the armature by grinding and polishing, it is found that a sufficiently bright image without appreciable distortion can be made by stamping the armature to the required shape with the use of a highly polished hardened steel tool. The tool must be rendered non-corrosive either by plating the operative surface of the tool or by using a stainless steel. The manufacture of armatures in this manner can be effected on mass production lines.

The free mounting of the very compact armature and the possibility of balancing it accurately without the necessity of special balancing devices enables very weak controlling forces to suffice. The angular deflection of the light beam is of course double that of the mirror. These factors combine to produce an instrument of great sensitivity and it has been found possible to obtain full scale deflection with a current variation as low as one-half milliampere.

When the instrument employing a concave cylindrical mirror surface is to be used in connection with radio receivers, a useful effect is obtained when the screen 18 is formed to provide a pair of translucent slots meeting at an angle as shown in Fig. 4. The line image 19 projected by the armature 10 is arranged to lie transversely of the two slots and to move towards the intersection thereof as the condition of resonance is approached, and cessation of travel of the line image towards the point of intersection of the two slots indicates correct tuning. Alternatively, a triangular-shaped translucent portion may be provided in the screen 18, the line image 19 being arranged to lie across the triangular portion as shown in Fig. 5 so that the length of the line image as viewed through the translucent portion is varied as tuning is effected, the condition of resonance being indicated when the line image is shortest or longest as desired according to the relative arrangement of the instrument and the screen.

Having now particularly described and ascertained the nature of my said invention and in what manner the same is to be performed, I declare that what I claim is:—

1. A device for indicating the precise tuning position of a radio receiving set determined by the flow of plate current in one of the vacuum tubes of the set, comprising a cylindrical casing closed at the bottom and open at the top, an armature having an upper polished surface pivotally mounted within said casing adjacent the open end thereof, a mass of liquid in said casing the upper level of which is above said armature, a translucent cap closing the top of said casing and having a central sunken portion which is disposed above the polished armature surface and which is caused to displace the liquid into the annular space formed by the sunken portion of the cap and the casing, a stationary current-conducting coil mounted externally of the casing, an armature polarizing magnet also disposed externally of the casing and in concentric relation with the stationary coil, a source of light disposed on that side of the armature provided with its polished surface, and a screen disposed in the path of the light reflected from said armature.

2. An indicating device according to claim 1 wherein the polished surface of the armature is concave and the screen is provided with a triangular translucent portion, the reflected light image on the screen indicating the precise tuning position of the set when the image has most nearly approached an apex of the triangular translucent portion.

HUBERT EDWARD GAUSS.